United States Patent
Furutono

(10) Patent No.: US 6,314,174 B1
(45) Date of Patent: Nov. 6, 2001

(54) APPARATUS FOR AND METHOD OF CONTROLLING CALLS, AND STORAGE MEDIUM STORING CALL CONTROL PROGRAM

(75) Inventor: Tomoyuki Furutono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/990,926

(22) Filed: Dec. 15, 1997

(30) Foreign Application Priority Data

Jun. 19, 1997 (JP) ........................................ 9-162187

(51) Int. Cl.[7] .............................. H04M 7/00; H04L 12/56
(52) U.S. Cl. ................... 379/221.06; 370/397; 370/408; 370/409; 370/410; 370/905; 379/229
(58) Field of Search ...................................... 379/229, 230, 379/231, 232, 233, 234, 220.01, 221.06, 221.07; 370/337, 396, 390, 408, 409, 410, 905

(56) References Cited

U.S. PATENT DOCUMENTS 5,724,358 * 3/1998 Headrick et al. ................. 370/905 X
5,748,621 * 5/1998 Masuda et al. ...................... 370/337
6,128,305 * 10/2000 Hjalmtysson et al. ............... 370/410

FOREIGN PATENT DOCUMENTS 58-215161    12/1983   (JP) .

* cited by examiner

Primary Examiner—Harry S. Hong
(74) Attorney, Agent, or Firm—Rosenman & Colin, LLP

(57) ABSTRACT

A call control apparatus shortens a call releasing process to effect the releasing process efficiently. The call control apparatus has a delay time determining factor managing function to manage a delay time determining factor which determines a delay time of the call releasing process for each path, a path order establishing function to establish an order of paths having successively smaller delay times based on the delay time determining factor, and a release request message transmitting function to transmit release request messages to effect the call releasing process to nodes or terminals according to the order of paths.

10 Claims, 21 Drawing Sheets

PARTY NUMBER MANAGEMENT TABLE 11a-1

| OUTPUT PATH | PARTY NUMBER |
|---|---|
| OUTPUT PATH 1 | 1 |
| OUTPUT PATH 2 | 2 |
| OUTPUT PATH 3 | 3 |

FIG. 7

STAGE NUMBER MANAGEMENT TABLE

11b-1

| CALL REFERENCE = R1 | |
|---|---|
| NUMBER OF STAGES FROM ROOT = 45 | |
| OUTPUT PATH | EVALU-ATION |
| OUTPUT PATH 1 | 0 |
| OUTPUT PATH 2 | 1 |
| OUTPUT PATH 3 | 3 |

FIG. 8

APPARATUS FOR AND METHOD OF CONTROLLING CALLS, AND STORAGE MEDIUM STORING CALL CONTROL PROGRAM

BACKGROUND OF THE INVENTION (1) Field of the Invention

The present invention relates to an apparatus for and a method of controlling calls, and a storage medium which stores a call control program, and more particularly to a call control apparatus for releasing a call, a call control apparatus for establishing a call, a call control method of releasing a call, a call control method of establishing a call, a storage medium which stores a call control program for releasing a call with a computer, and a storage medium which stores a call control program for establishing a call with a computer.

(2) Description of the Related Art

As the networking technology advances, needs for information communications increase, and services for providing such information communications are available in a diverse range. One service that is applicable to the NVOD (Near-Video-On-Demand) system employs a multicast call control function.

According to the multicast call control function, information such as sound and image information sent from a transmission terminal is copied in a switching exchange, and distributed to a plurality of reception terminals according to a point-to-multipoint multicast routing process.

A switching exchange with a multicast call control function establishes and releases calls between terminals and adjacent switching exchanges according to a user-network interface (UNI) or a network-network interface (NNI) which has been standardized by ITU-T.

A switching exchange with a multicast call control function copies information at a suitable branching point and sends the information to a plurality of users according to a point-to-multipoint multicast routing process.

FIG. 20 of the accompanying drawings shows in block form a connected configuration of a multicast call control system. In the multicast call control system, a transmission terminal for transmitting information is referred to as a root, and a reception terminal for receiving information is referred to as a leaf, with a switching exchange corresponding to a node.

In FIG. 20, a node N1 is connected to a root R1 and nodes N2, N3, N4 are connected to the node N1. Leaves L1, L2 are connected to the node N2. Leaves L3, L4 are connected to the node N3. Leaves L5, L6 are connected to the node N4.

Information transmitted from the root R1 is copied in each of the nodes N1–N4, and multicast to the leaves L1–L6.

To release the leaves L1–L6, an REL signal which represents a release request massage is issued from the root R1 for thereby releasing all the leaves L1–L6 which belong to the same call.

FIG. 21 of the accompanying drawings illustrates a releasing sequence for releasing the leaves L1–L6 of the multicast call control system shown in FIG. 20.

The releasing sequence shown in FIG. 21 is carried out as follows:

[S1] The root R1 transmits an REL signal which represents a release request massage to the node N1.

[S2] The node N1 transmits an RLC signal which is a response signal to the root R1.

[S3] The node N1 transmits the REL signal successively to the nodes N2, N3, N4.

[S4] The nodes N2, N3, N4 transmit respective RLC signals to the node N1.

The above releasing process is prescribed according to ITU-T recommendations Q.2971, Q2722.1. These ITU-T recommendations, however, fail to refer to the order in which a plurality of output paths issue respective release request messages. While the node N1 issues REL signals successively to the nodes N2, N3, N4 in the order named in FIG. 21, the node N1 does not need to issue REL signals in the illustrated order, but may issue REL signals in an arbitrary order.

The above releasing process does not take into account any efficient release order. Therefore, depending on the order of issuance of release request messages, a delay time spent after a root sends a release request to a network until a final leaf is released may become very long.

Another problem is that when a new multicast call is to be established after a root has issued a release request message to a network, if simultaneous releasing of a previously established multicast call is still uncompleted in the network, then designated terminals may possibly remain busy, and a new call may not be established to those designated terminals.

SUMMARY OF THE INVENTION

An object of the present invention is to provide a call control apparatus for effecting a call releasing process efficiently by shortening a call release delay time.

Another object of the present invention is to provide a call control apparatus for effecting a call establishing process efficiently by shortening a call release delay time.

Still another object of the present invention is to provide a call control method of effecting a call releasing process efficiently by shortening a call release delay time.

Yet still another object of the present invention is to provide a call control method of effecting a call establishing process efficiently by shortening a call release delay time.

A further object of the present invention is to provide a storage medium which stores a call control program for effecting a call releasing process efficiently by shortening a call release delay time.

A still further object of the present invention is to provide a storage medium which stores a call control program for effecting a call establishing process efficiently by shortening a call release delay time.

According to an aspect of the present invention, there is provided a call control apparatus for effecting a call releasing process, comprising delay time determining factor managing means for managing a delay time determining factor which determines a delay time of the call releasing process for each path, path order establishing means for establishing an order of paths having successively smaller delay times based on the delay time determining factor, and release request message transmitting means for transmitting release request messages to effect the call releasing process to nodes or terminals according to the order of paths.

According to another aspect of the present invention, there is provided a call control apparatus for effecting a call establishing process, comprising delay time determining factor managing means for managing a delay time determining factor which determines a delay time of the call establishing process for each path, path order establishing means for establishing an order of paths having successively smaller delay times based on the delay time determining factor, and establishment request message transmitting means for transmitting establishment request messages to effect the call establishing process to nodes or terminals according to the order of paths.

According to still another aspect of the present invention, there is provided a call control method of effecting a call releasing process, comprising the steps of managing a delay time determining factor which determines a delay time of the call releasing process for each path, establishing an order of paths having successively smaller delay times based on the delay time determining factor, and transmitting release request messages to effect the call releasing process to nodes or terminals according to the order of paths.

According to yet still another aspect of the present invention, there is provided a call control method of effecting a call establishing process, comprising the steps of managing a delay time determining factor which determines a delay time of the call establishing process for each path, establishing an order of paths having successively smaller delay times based on the delay time determining factor, and transmitting establishment request messages to effect the call establishing process to nodes or terminals according to the order of paths.

According to a further aspect of the present invention, there is provided a storage medium which stores a call control program for effecting a call releasing process by controlling a computer to function as delay time determining factor managing means for managing a delay time determining factor which determines a delay time of the call releasing process for each path, path order establishing means for establishing an order of paths having successively smaller delay times based on the delay time determining factor, and release request message transmitting means for transmitting release request messages to effect the call releasing process to nodes or terminals according to the order of paths.

According to a still further aspect of the present invention, there is provided a storage medium which stores a call control program for effecting a call establishing process by controlling a computer to function as delay time determining factor managing means for managing a delay time determining factor which determines a delay time of the call establishing process for each path, path order establishing means for establishing an order of paths having successively smaller delay times based on the delay time determining factor, and establishment request message transmitting means for transmitting establishment request messages to effect the call establishing process to nodes or terminals according to the order of paths.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram showing a party number management table;

FIG. 8 is a diagram showing a stage number management table;

DESCRIPTION OF THE PREFERRED EMBODIMENTS

Figure 1:
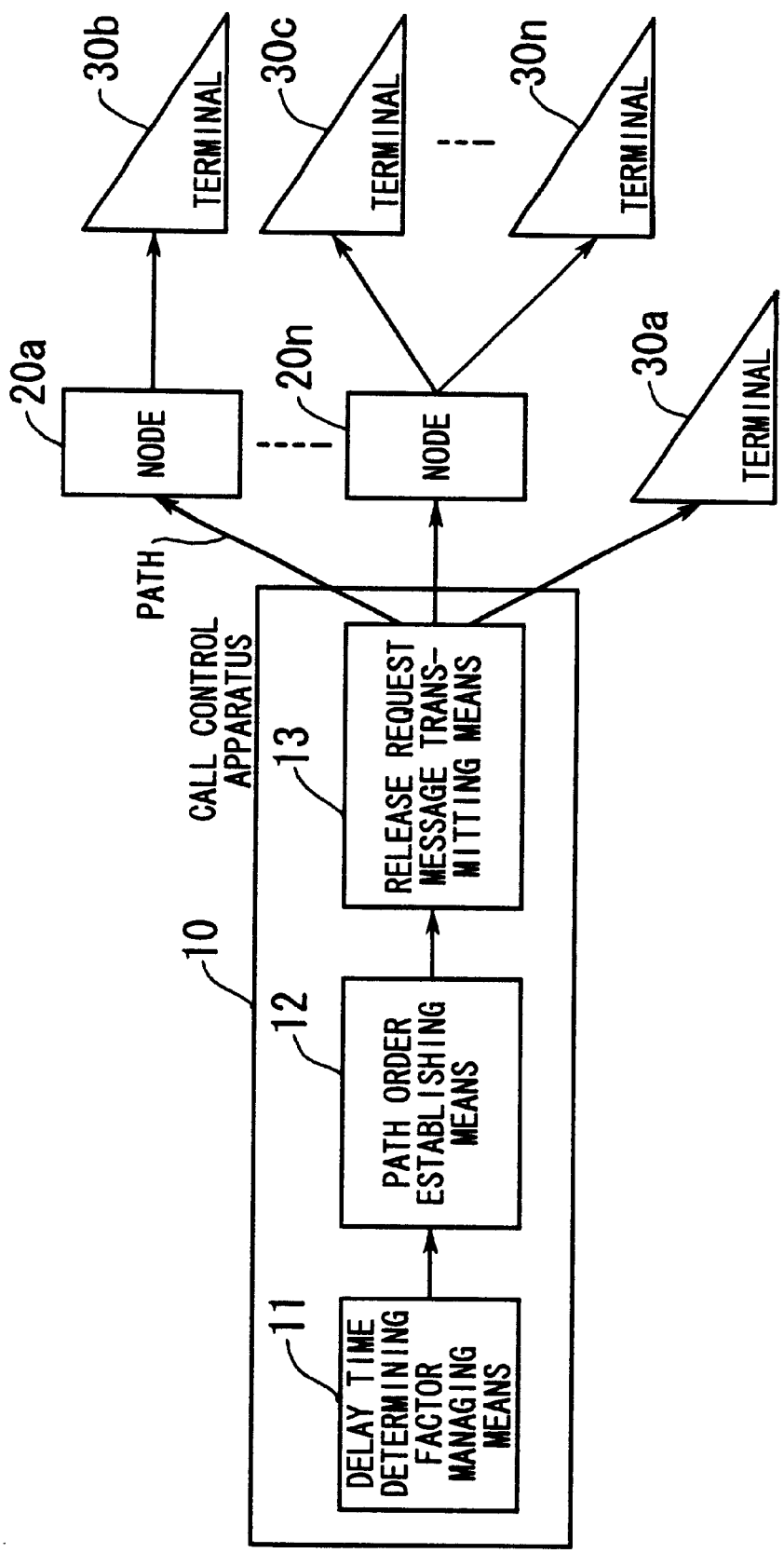
FIG. 1 is a block diagram illustrating the principles of a call control apparatus according to the present invention.

FIG. 1 illustrates the principles of a call control apparatus 10 according to the present invention. The call control apparatus 10 shown in FIG. 1 effects a releasing process of simultaneously releasing a call to terminals 30a–30n that belong to the same call.

The call control apparatus 10 has a delay time determining factor managing means 11 for managing a delay time determining factor which determines a delay time of the releasing process for each path. The call control apparatus also has a path order establishing means 12 for establishing an order of paths having successively smaller delay times based on the delay time determining factor and a release request message transmitting means 13 for transmitting release request messages to release calls to nodes 20a–20n and a terminal 30a according to the established order of paths. Release request messages are transmitted through the nodes 20a–20n to terminals 30b–30n.

Figure 2:
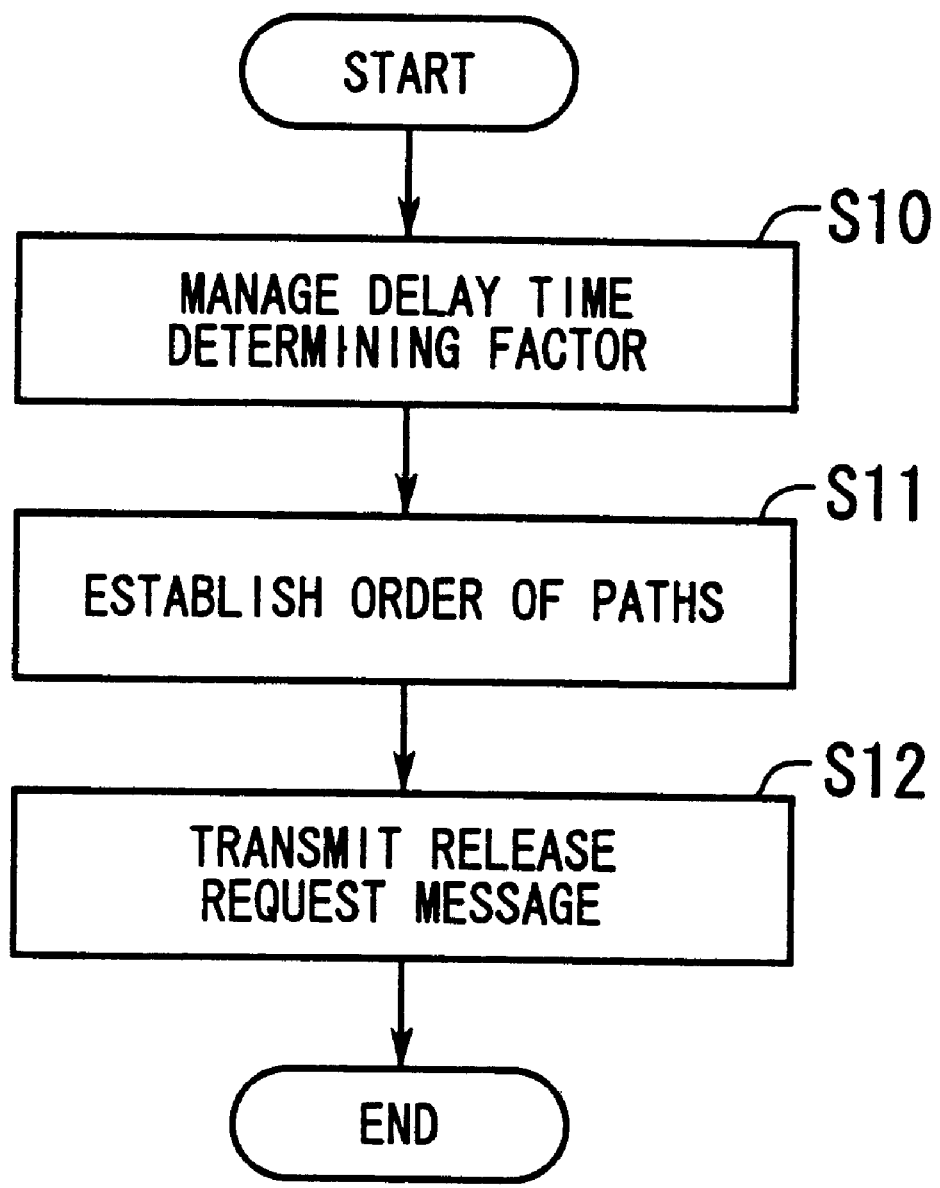
FIG. 2 is a flowchart of an operation sequence of the call control apparatus according to the present invention.

Operation of the call control apparatus 10 will be described below. FIG. 2 shows an operation sequence of the call control apparatus 10.

[S10] The delay time determining factor managing means 11 manages a delay time determining factor which determines a delay time of the releasing process for each path. The delay time determining factor is at least one of the number of terminals belonging to each path and the number of node stages belonging to each path.

[S11] The path order establishing means 12 establishes an order of paths having successively smaller delay times based on the delay time determining factor.

[S12] The release request message transmitting means 13 transmits release request messages to release calls to the nodes 20a–20n and the terminal 30a according to the established order of paths.

Figure 3:
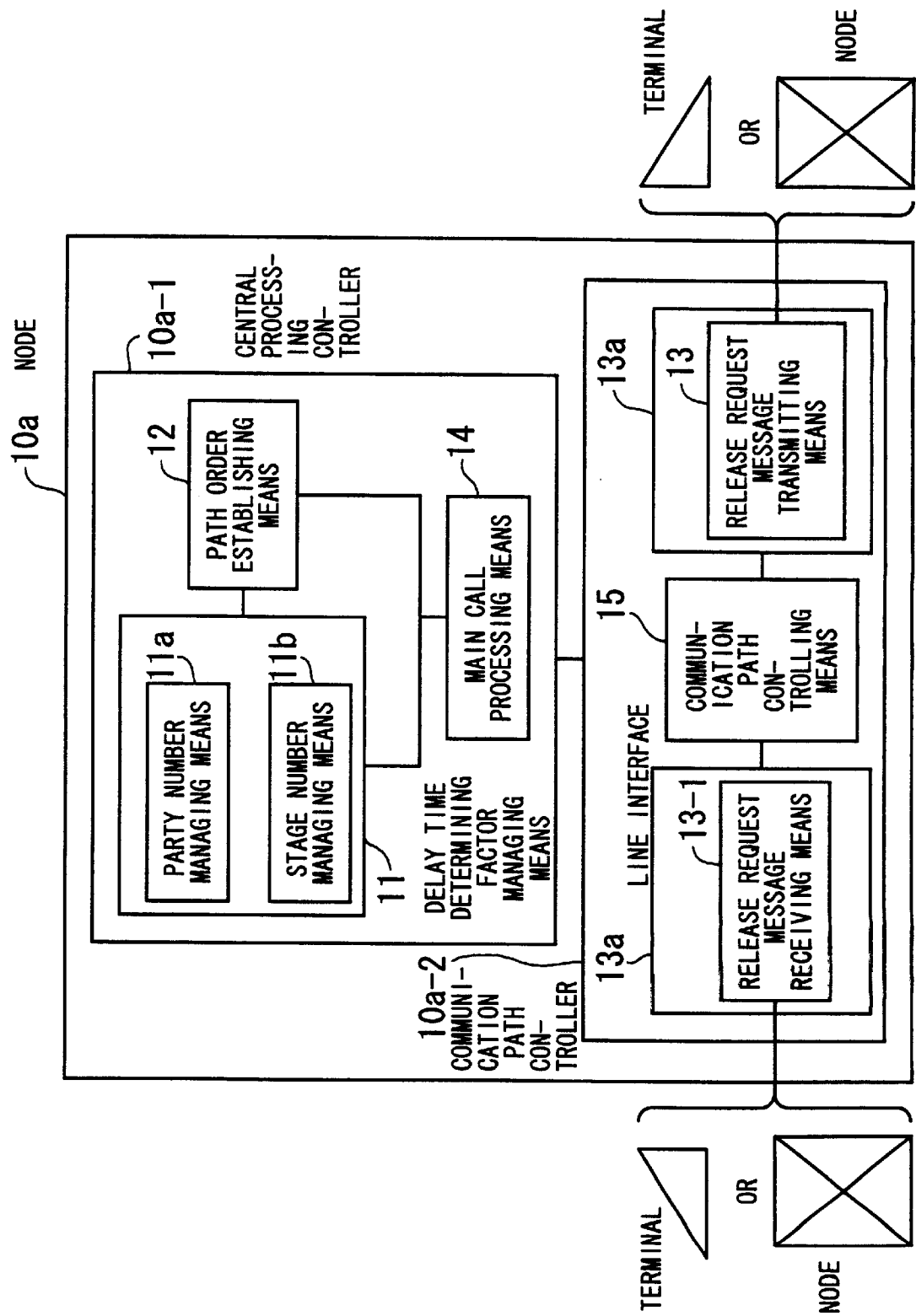
FIG. 3 is a detailed block diagram of a node which includes the call control apparatus.

Details of a node which incorporates the call control apparatus 10 will be described below. The call control apparatus 10 is accommodated in a node which corresponds to a switching exchange. FIG. 3 shows in detail a node 10a which incorporates the call control apparatus 10. Those parts shown in FIG. 3 which are identical to those shown in FIG. 1 are denoted by identical reference numerals and will not be described in detail below.

The node 10a comprises a central processing controller 10a-1 and a communication path controller 10a-2. The central processing controller 10a-1 is a basic processor for carrying logic operations inherent in the switching exchange, such as various operations, data transfer, data writing, and data reading. The delay time determining factor managing means 11 and the path order establishing means 12 are included in the central processing controller 10a-1.

The central processing controller 10a-1 has a main call processing means 14 connected to the delay time determining factor managing means 11 and the path order establishing means 12, for controlling overall call processing operation. The main call processing means 14 controls overall call processing operation by executing a control program stored in a ROM with a RAM used as a work area, and has a multiprocessor system architecture.

The delay time determining factor managing means 11 comprises a party number managing means 11a and a stage number managing means 11b, and serves to manage a delay time determining factor which determines a delay time of the releasing process for each path.

The party number managing means 11a manages the number of parties, i.e., the number of terminals, belonging to each path as a delay time determining factor. The stage number managing means 11b manages the number of node stages belonging to outgoing interface as a delay time determining factor. Details of the party number managing means 11a and the stage number managing means 11b will be described later on.

The communication path controller 10a-2 serves to control a switch circuit network and line signals, and comprises a line interface 13a and a communication path controlling means 15.

The line interface 13a is connected to terminals and other nodes and monitors line states. The line interface 13a has a release request message transmitting means 13 and a release request message receiving means 13-1, and serve to transmit and receive control signals and various messages. The line interface 13a transmits and receives not only release request messages, but also other messages.

The communication path controlling means 15 has a function to control connection of the switch circuit network and establish paths, or a function to copy cells, and serves to control communication paths for multicasting the same information.

Figure 4:
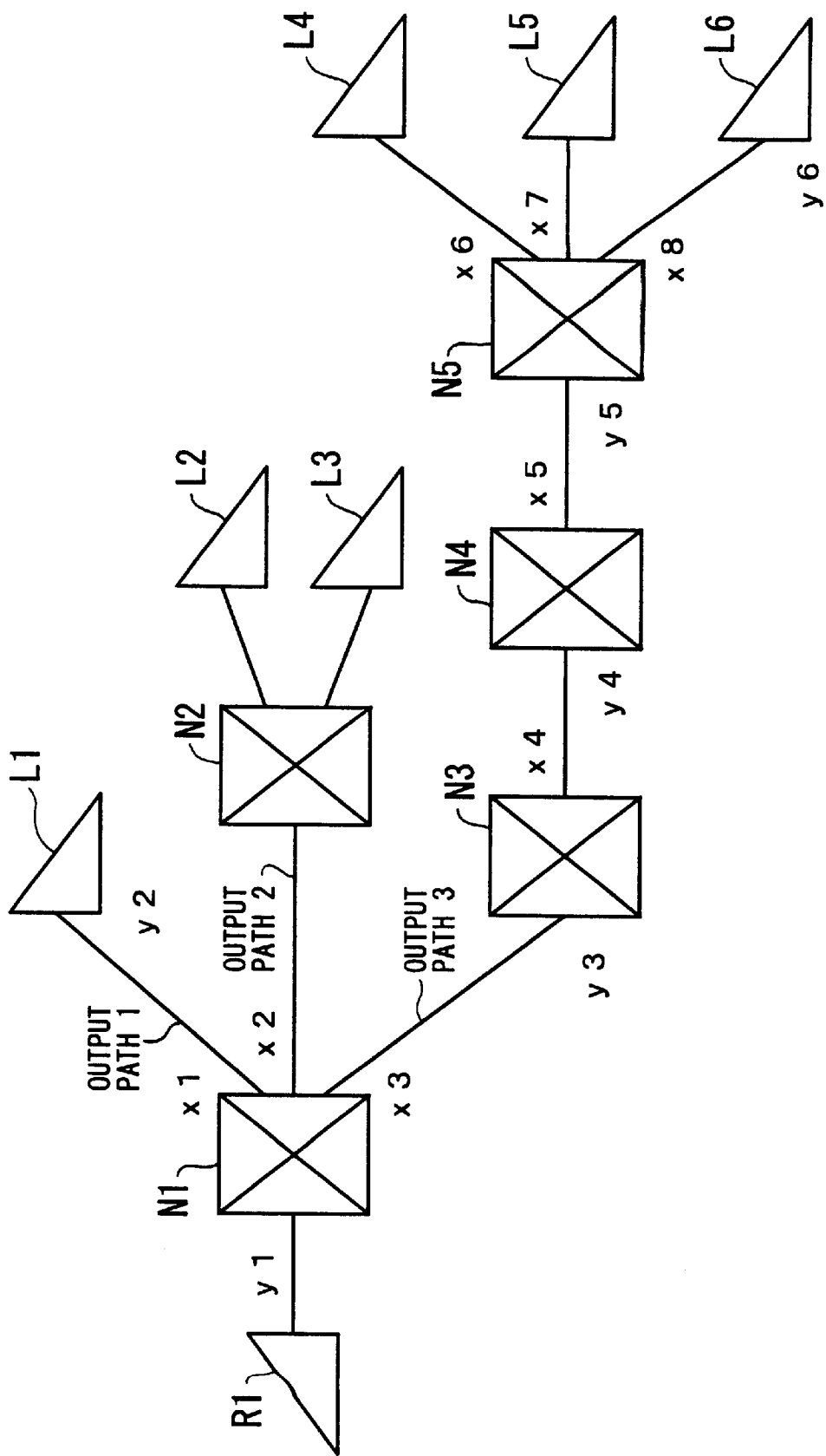
FIG. 4 is a block diagram illustrating a delay time which is introduced after a root issues a release request message until a leaf is released.

A delay time consumed after a root sends a release request message until a leaf is released will be described in detail below. FIG. 4 illustrates a delay time which is introduced after a root R1 issues a release request message until a leaf is released.

In FIG. 4, the leaf which suffers the longest delay time for its releasing process is a leaf L6. It is assumed that a node N1 issues release request messages successively to output paths 1, 2, 3 in the order named.

Reference characters beginning with "x" denote times required for the nodes to issue a release request message, and reference characters beginning with "y" denote communication delay times between terminals (root or leaves) and nodes or between nodes. It is assumed that $x1=x2=\ldots=x8=x$, and $y1=y2=\ldots=y6=y$.

The delay time until a request release message reaches a leaf L1 is expressed by the following equation:

$$y1+x1+y2=x+2y \quad (1)$$

If it is assumed that a node N5 issues release request messages successively to leaves L4, L5, L6 in the order named, then the delay time until a request release message reaches the leaf L6 is expressed by the following equation:

$$y1+x1+x2+x3+y3+x4+y4+x5+y5+x6+x7+x8+y6=8x+5y \quad (2)$$

Now, it is assumed that the node N1 issues release request messages successively to the output paths 3, 2, 1 in the order named, i.e., the node No issues release request messages first to the leaf L6 having the longest delay time and finally to the leaf L1 having the shortest delay time.

The delay time until a request release message reaches the leaf L1 is expressed by the following equation:

$$y1+x3+x2+x1+y2=3x+2y \quad (3)$$

The delay time until a request release message reaches the leaf L6 is expressed by the following equation:

$$y1+x3+y3+x4+x5+y5+x6+x7+x8+y6=6x+5y \quad (4)$$

Therefore, the delay time spend until a leaf is released varies depending on the order in which request release messages are issued.

A comparison between the equations (2) and (4) showing delay times for the leaf L6 indicates that the delay time represented by the equation (4) is smaller than the delay time represented by the equation (2).

Consequently, in the example given above, the delay time of the overall releasing process is smaller and the releasing process is more efficient when release request messages are issued first to the leaf L6 and finally to the leaf L1, i.e., successively to the output paths 3, 2, 1 in the order named, than when release request messages are issued successively to the output paths 1, 2, 3 in the order named.

With respect to the leaf L1, the delay time is smaller when release request messages are issued successively to the output paths 1, 2, 3 in the order named than when release request messages are issued successively to the output paths 3, 2, 1 in the order named. Since this delay time is intrinsically small, it does not affect attempts to complete the releasing of the entire network.

As described above, when release request messages are issued successively to leaves who need progressively smaller delay times for being released, the entire network can quickly and efficiently be released.

Figure 5:
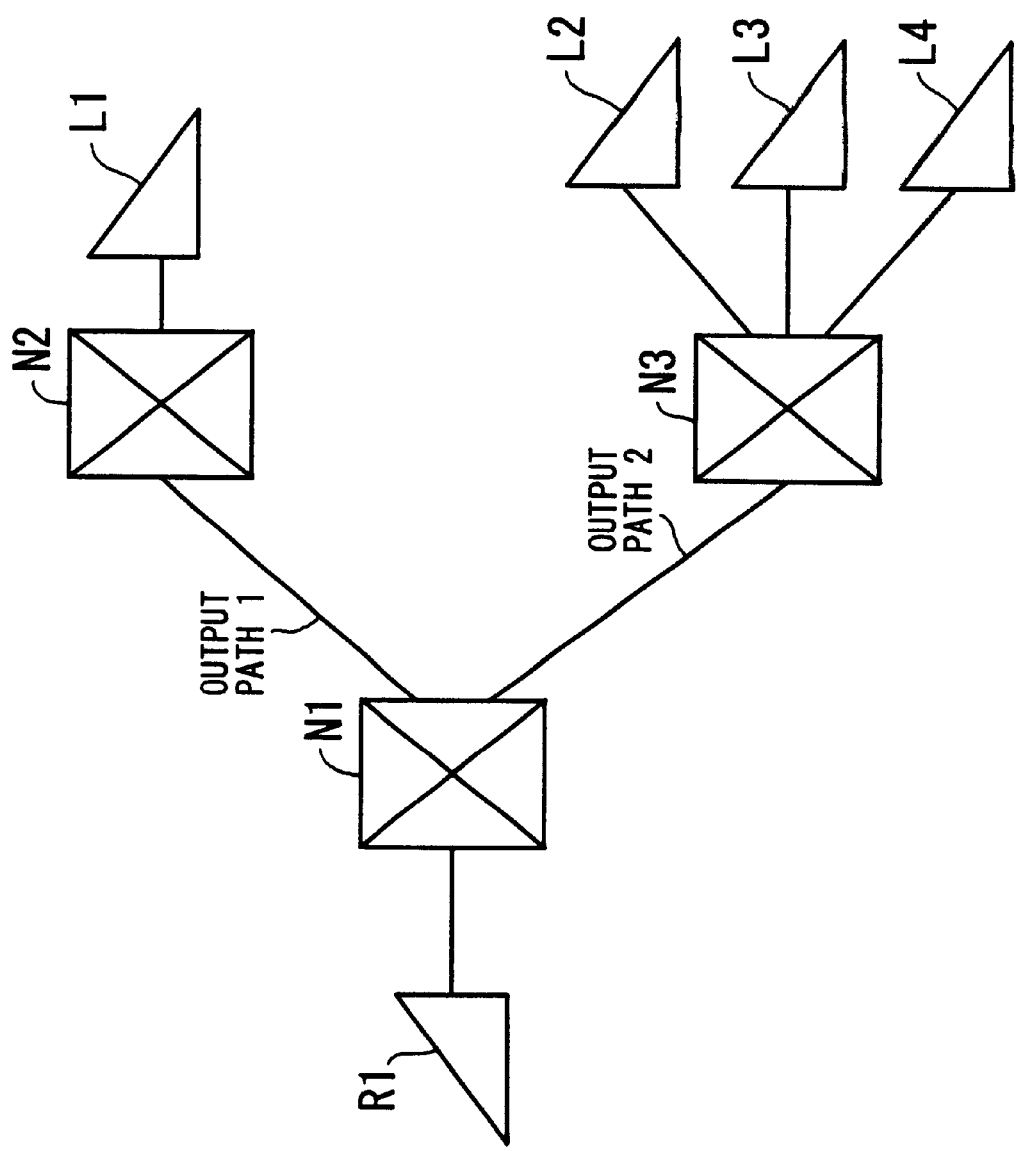
FIG. 5 is a block diagram of a network configuration in which the number of parties serves as a factor for determining a delay time.

Delay time determining factors for determining a delay time of the releasing process will be described below. FIG. 5 shows a network configuration in which the number of parties serves as a factor for determining a delay time. The number of parties represents the number of terminals belonging to each path. Specifically, the number of parties represents the number of terminals connected to a VC (virtual channel). In FIG. 4, the number of parties with respect to the output path 1 is "1" indicating the leaf L1, and the number of parties with respect to the output path 3 is "3" indicating the leaves L4–L6. In the network configuration shown in FIG. 5, a node N1 is connected to a root R1, nodes N2, N3 to the node N1, a leaf L1 to the node N2, and leaves L2–L4 to the node N3.

The single leaf L1 is connected to the node N2, whereas the three leaves L2–L4 are connected to the node N3. Therefore, when a release request message is issued from the root R1, the node N1 should issue release request messages first to the output path 2 and then to the output path 1 to reduce the relay time of the releasing process in order to complete the releasing process for the entire network quickly. Stated otherwise, a release request message should first be issued to an output path which takes more time in the releasing process.

In the network configuration shown in FIG. 5, therefore, the number of parties, i.e., the number of terminals belonging to each path, serves as a factor for determining a delay time of each path. Thus, an order of paths should be established on the basis of the number of parties, and release request messages should be transmitted to the terminals according to the established order of paths.

Figure 6:
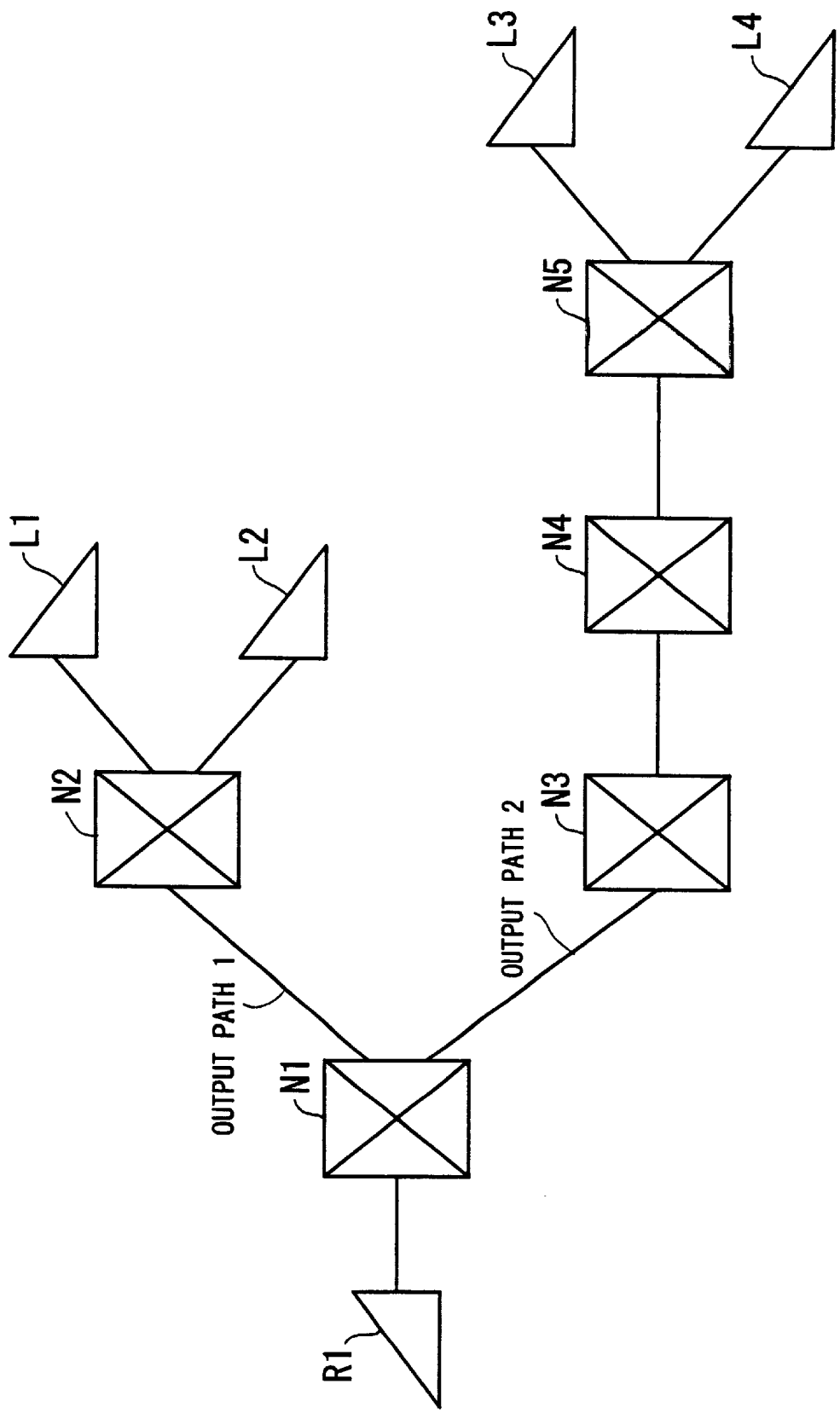
FIG. 6 is a block diagram of a network configuration in which the number of stages serves as a factor for determining a delay time.

FIG. 6 shows a network configuration in which the number of stages serves as a factor for determining a delay time. The number of stages represents the number of nodes belonging to each path. In FIG. 4, the number of stages with respect to the output path 1 is "0", and the number of stages with respect to the output path 3 is "3" indicating the nodes N3–N5.

In the network configuration shown in FIG. 6, a node N1 is connected to a root R1, nodes N2, N3 to the node N1, leaves L1, L2 to the node N2, the node N3 to a node N4, the node N4 to a node N5, and the node N5 to leaves L3, L4.

While two leaves are connected to each of the nodes N2, N5, the number of stages with respect to the output path 2 is greater than the number of stages with respect to the output path 1.

Therefore, when a release request message is issued from the root R1, the node N1 should issue release request messages first to the output path 2 and then to the output path 1 to reduce the relay time of the releasing process in order to complete the releasing process for the entire network quickly. Stated otherwise, a release request message should first be issued to an output path which takes more time in the releasing process.

In the network configuration shown in FIG. 6, therefore, the number of stages, i.e., the number of nodes belonging to each path, serves as a factor for determining a delay time of each path. Thus, an order of paths should be established on the basis of the number of stages, and release request messages should be transmitted to the terminals according to the established order of paths.

The party number managing means 11a will be described below. FIG. 7 shows a party number management table 11a-1. The party number management table 11a-1 is managed in the party number managing means 11a, and contains items of output path and party number.

The data contained in the party number management table 11a-1 correspond to the configuration shown in FIG. 4. In the party number management table 11a-1, the number of parties with respect to the output path 1 is "1", the number of parties with respect to the output path 2 is "2", and the number of parties with respect to the output path 3 is "3".

The stage number managing means 11b will be described below. FIG. 8 shows a stage number management table 11b-1. The stage number management table 11b-1 is managed in the stage number managing means 11b for each call, i.e., for each root, and contains items of output path and evaluation value.

The data contained in the stage number management table 11b-1 correspond to the configuration shown in FIG. 4. In the stage number management table 11b-1, "CALL REFERENCE=R1" means that the stage number management table 11b-1 belongs to the root R1, and "NUMBER OF STAGES FROM ROOT" means that the number of nodes between the root R1 and the leaves at the terminal ends of the network.

The evaluation value is a value expressed by the following equation:

Evaluation value=a×the number of stages+old evaluation value (5)

where "a" is a coefficient. The old evaluation value is "0" if no leaf is established. The equation (5) is a function of the delay time spent to reach a leaf with the number of stages as a variable. Therefore, the evaluation value is a value proportional to the delay time of each path.

Figure 9:
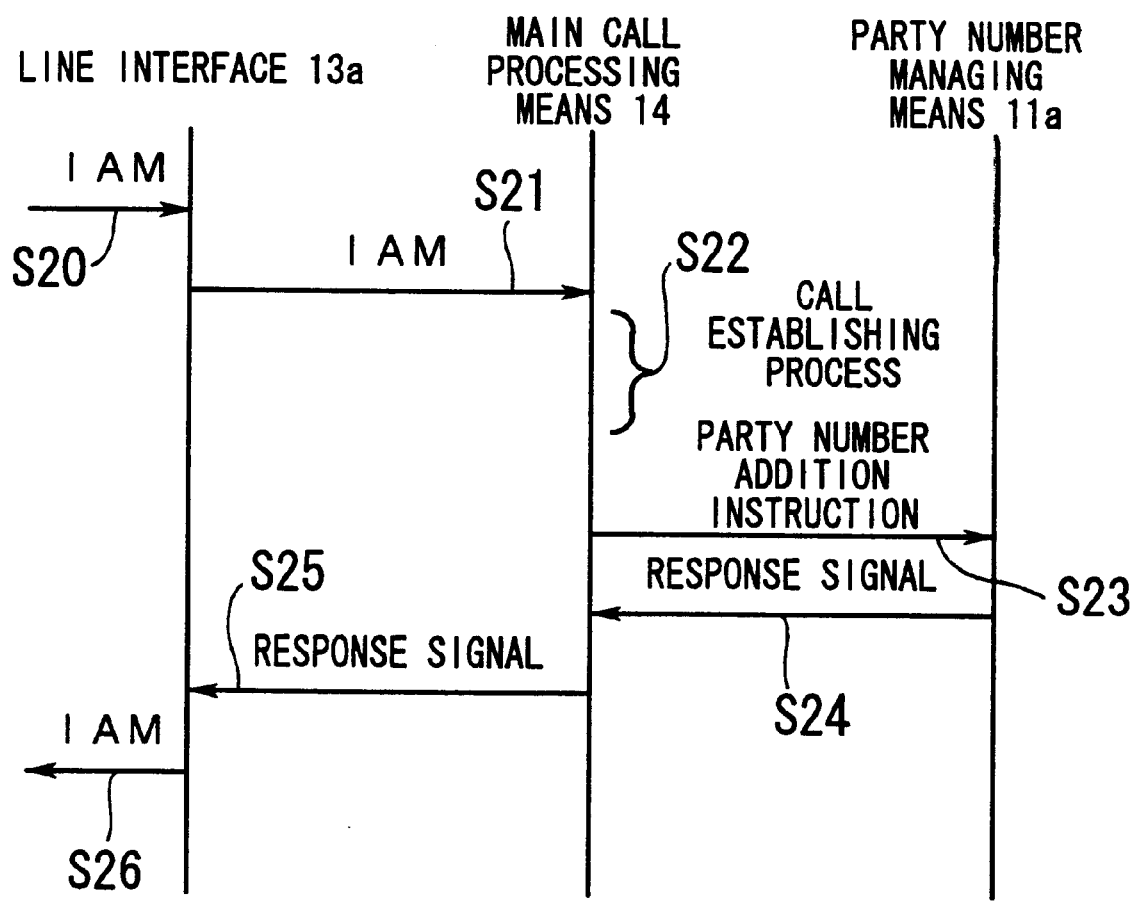
FIG. 9 is a sequence diagram showing a process of establishing a call before the call control apparatus releases a call based on the number of parties.

Operation of the call control apparatus 10 for releasing a call based on the number of parties will be described below. FIG. 9 shows a process of establishing a call before the call control apparatus 10 releases a call based on the number of parties.

[S20] The line interface 13a receives an IAM (Initial Address Message) signal, which is a call establishing message, from a preceding node.

[S21] The line interface 13a transmits the IAM signal to the main call processing means 14.

[S22] The main call processing means 14 effects a routing process, as a call establishing process, for establishing an output path for an incoming call based on the IAM signal.

[S23] The main call processing means 14 transmits a party number addition instruction signal for adding "1" to the number of parties with respect to the output path to the party number managing means 11a.

[S24] The party number managing means 11a adds "1" to the number of parties, and transmits a response signal to the main call processing means 14.

[S25] The main call processing means 14 transmits a response signal to the line interface 13a.

[S26] The line interface 13a transmits an IAM signal to a next node.

Figure 10:
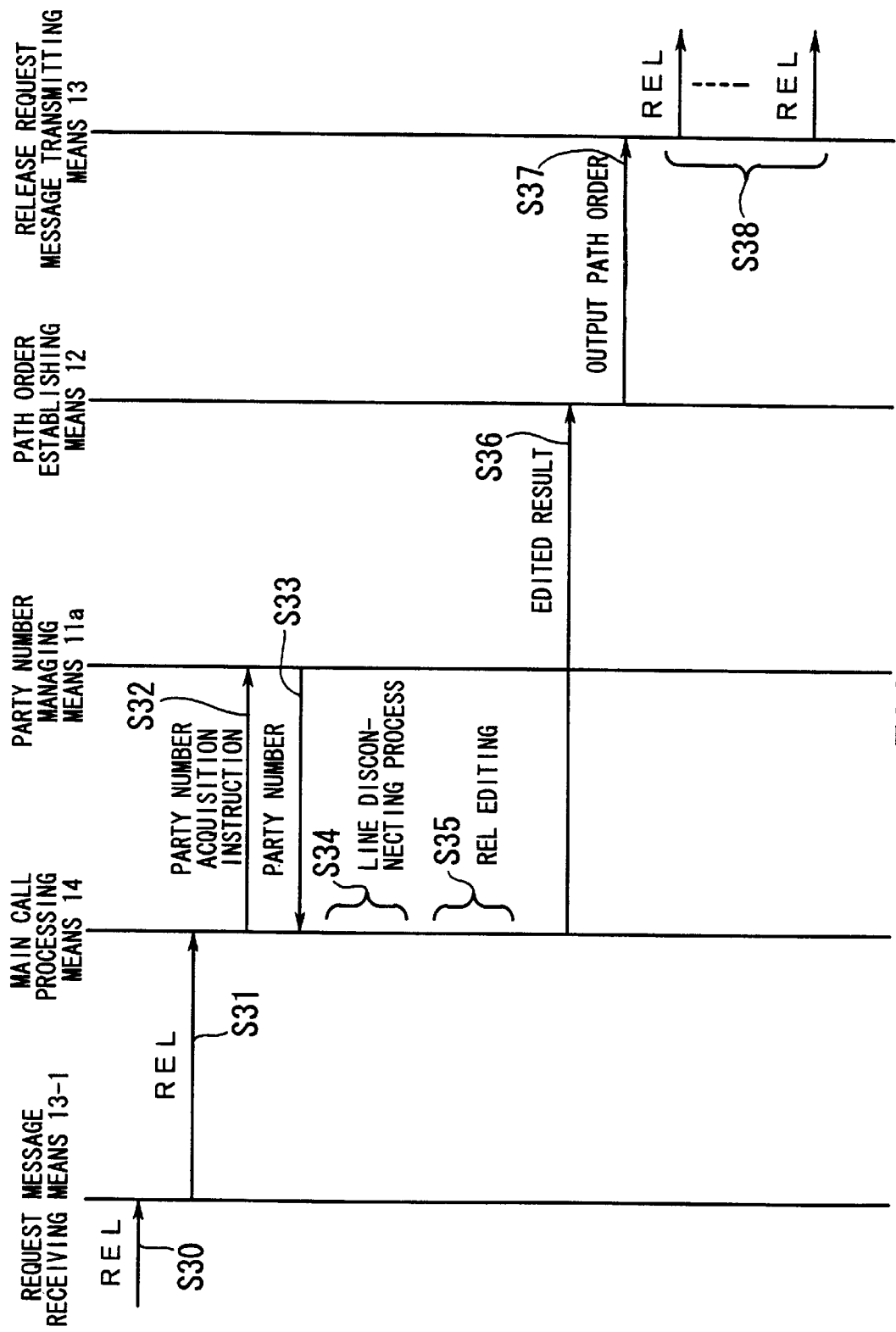
FIG. 10 is a sequence diagram showing a process of releasing a call with the call control apparatus based on the number of parties.

FIG. 10 shows a process of releasing a call with the call control apparatus 10 based on the number of parties.

[S30] The release request message receiving means 13-1 receives an REL signal, which is a release request message, from the root.

[S31] The release request message receiving means 13-1 transmits the REL signal to the main call processing means 14.

[S32] The main call processing means 14 transmits a party number acquisition instruction signal to the party number managing means 11a.

[S33] The party number managing means 11a transmits the number of parties corresponding to an output path the main call processing means 14. The steps 532, S33 are carried out as many times as the number of output paths.

[S34] The main call processing means 14 controls the communication path controlling means 15 to disconnect the line by stopping the delivery of cells flowing in the VC (virtual channel) of the output path.

[S35] The main call processing means 14 edits various items of information of the REL signal. For example, the main call processing means 14 edits an identifier and a releasing factor.

[S36] The main call processing means 14 transmits an edited result which contains party number information to the path order establishing means 12.

[S37] The path order establishing means 12 establishes an order of paths having progressively smaller numbers of parties, and transmits the established order of paths to the release request message transmitting means 13.

[S38] The release request message transmitting means 13 transmits REL signals according to the order of paths which has been received.

Thereafter, the main call processing means 14 within the node releases itself by receiving RLC signals responsive to the REL signals.

Figure 11:
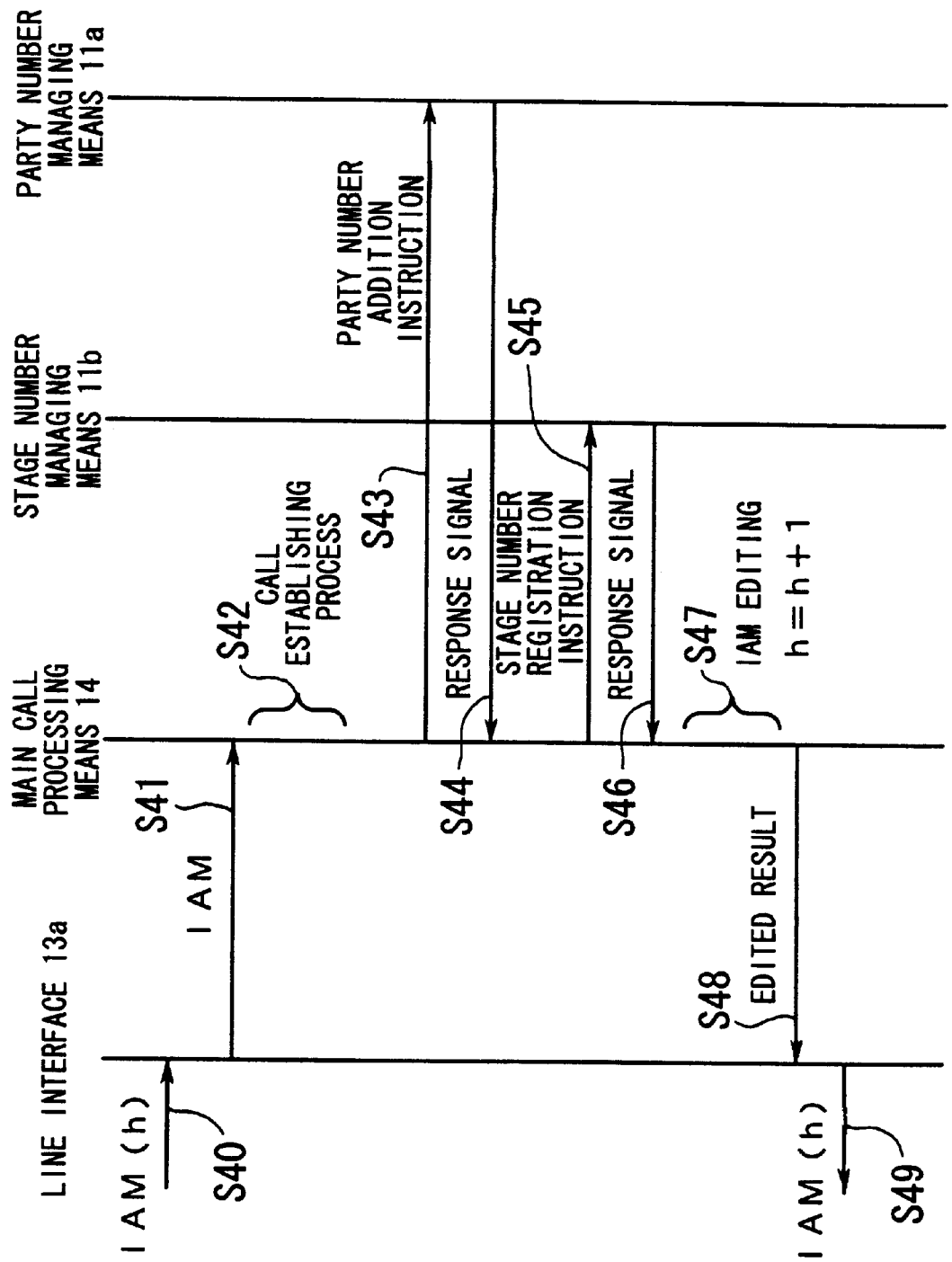
FIG. 11 is a sequence diagram showing a preparation process of establishing a call before the call control apparatus releases a call based on an evaluation value.
Figure 12:
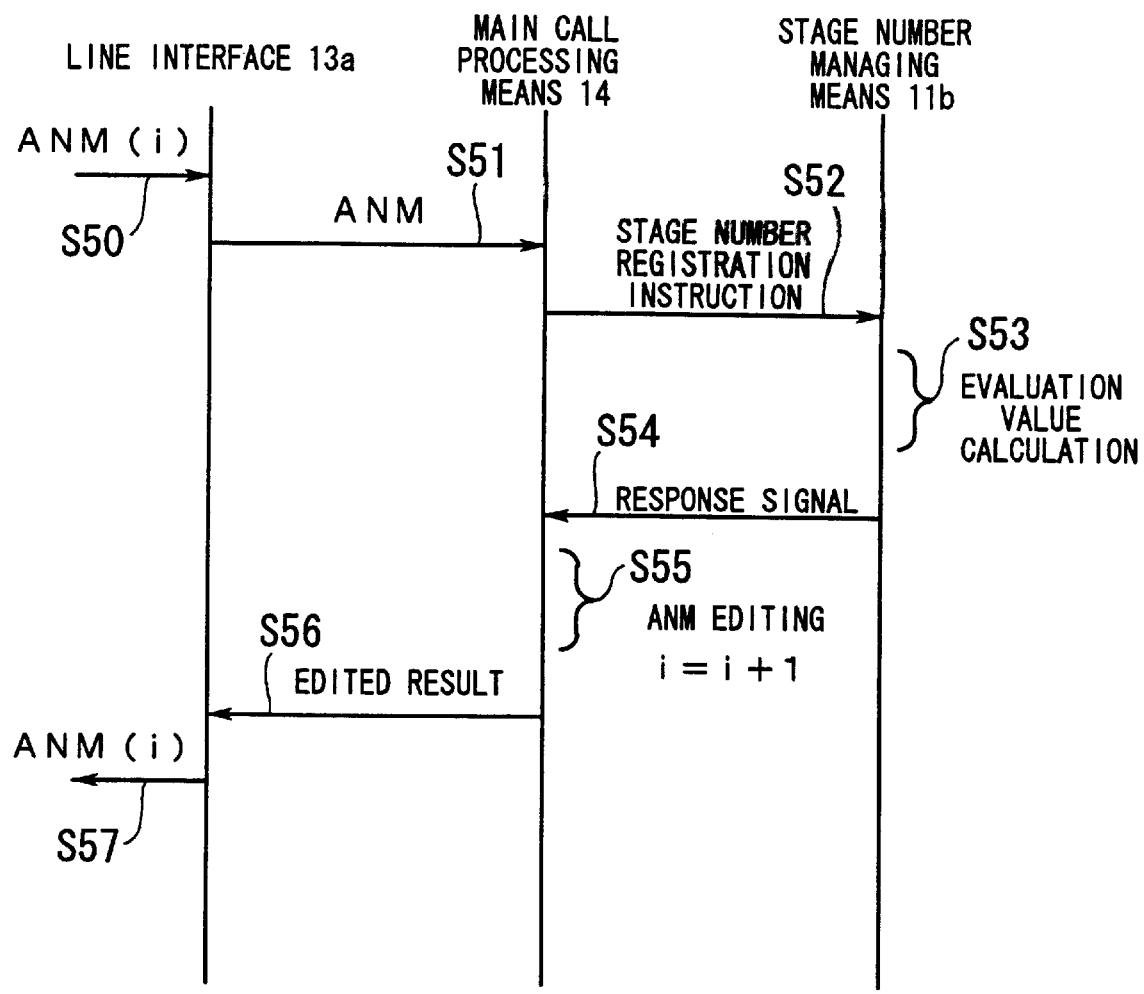
FIG. 12 is a sequence diagram showing a preparation phase on a process of establishing a call for the call control apparatus releasing a call based on an evaluation value.

Operation of the call control apparatus 10 for releasing a call based on an evaluation value will be described below. FIGS. 11 and 12 each show a process of establishing establishing a call before the call control apparatus 10 releases a call based on an evaluation value. FIG. 11 shows a process of establishing the number of stages from the root.

[S40] The line interface 13a receives an IAM signal, which is a call establishing message, from a preceding node. The IAM signal contains information representing the number h of stages from the root.

[S41] The line interface 13a transmits the IAM signal to the main call processing means 14.

[S42] The main call processing means 14 effects a routing process, as a call establishing process, for establishing an output path for an incoming call based on the IAM signal.

[S43] The main call processing means 14 transmits a party number addition instruction signal for adding "1" to the number of parties with respect to the output path to the party number managing means 11a.

[S44] The party number managing means 11a adds "1" to the number of parties, and transmits a response signal to the main call processing means 14.

[S45] The main call processing means 14 transmits a stage number registration instruction signal to the stage number managing means 11b.

[S46] The stage number managing means 11b holds the number h of stages, and transmits a response signal to the main call processing means 14.

[S47] The main call processing means 14 adds "1" to the number h of stages held in the step S46, producing a new number h of stages. The new number h of stages indicates how many stages this node is spaced from the root. Then, the main call processing means 14 edits the IAM signal.

[S48] The main call processing means 14 transmits an edited result which contains the number h of stages to the line interface 13a.

[S49] The line interface 13a transmits an IAM signal that contains information of the number h of stages to a next node.

FIG. 12 shows a process of establishing the number of stages from a leaf.

[S50] The line interface 13a receives an ANM (Answer Message) signal, which is a call establishing response message, from a preceding node. The ANM signal contains information representing the number i of stages from a leaf.

[S51] The line interface 13a transmits the ANM signal to the main call processing means 14.

[S52] The main call processing means 14 transmits a stage number registration instruction signal to the stage number managing means 11b.

[S53] The stage number managing means 11b calculates an evaluation value based on the number i of stages, and holds the calculated evaluation value in the stage number management table 11b-1.

[S54] The stage number managing means 11b transmits a response signal to the main call processing means 14.

[S55] The main call processing means 14 adds "1" to the number i of stages, producing a new number i of stages. The new number i of stages indicates how many stages this node is spaced from the leaf. Then, the main call processing means 14 edits the ANM signal.

[S56] The main call processing means 14 transmits an edited result which contains the number i of stages to the line interface 13a.

[S57] The line interface 13a transmits an ANM signal that contains information of the number i of stages to a next node.

Figure 13:
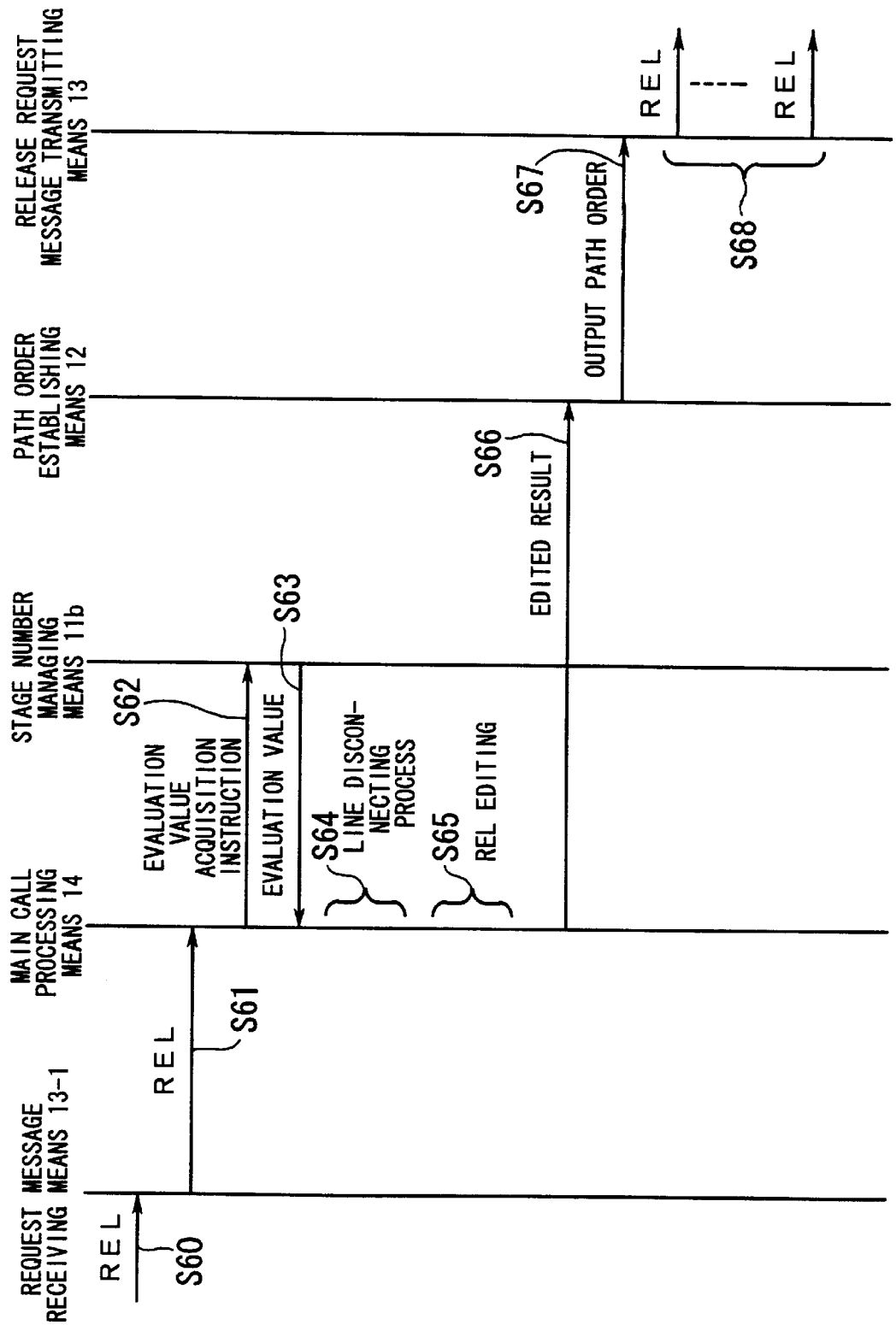
FIG. 13 is a sequence diagram showing a process of releasing a call with the call control apparatus based on an evaluation value.

FIG. 13 shows a process of releasing a call with the call control apparatus 10 based on an evaluation value.

[S60] The release request message receiving means 13-1 receives an REL signal, which is a release request message, from the root.

[S61] The release request message receiving means 13-1 transmits the REL signal to the main call processing means 14.

[S62] The main call processing means 14 transmits an evaluation value acquisition instruction signal to the stage number managing means 11b.

[S63] The stage number managing means 11b transmits an acquisition value corresponding to an output path to the main call processing means 14. The steps S62, S63 are carried out as many times as the number of output paths.

[S64] The main call processing means 14 controls the communication path controlling means 15 to disconnect the line.

[S65] The main call processing means 14 edits various items of information of the REL signal.

[S66] The main call processing means 14 transmits an edited result which contains evaluation value information to the path order establishing means 12.

[S67] The path order establishing means 12 establishes an order of paths having progressively smaller evaluation values, and transmits the established order of paths to the release request message transmitting means 13.

[S68] The release request message transmitting means 13 transmits REL signals according to the order of paths which has been received.

Thereafter, the main call processing means 14 within the node releases itself by receiving RLC signals responsive to the REL signals.

As described above, the call control apparatus 10 establishes an order of paths having successively smaller delay times consumed in releasing processes, and transmits release request messages according to the established order of paths. In this manner, the call control apparatus 10 shortens delay times consumed in releasing a call for thereby carrying out the overall releasing process efficiently.

In the above description, the number of parties and an evaluation value are separately employed to establish an order of paths having successively smaller delay times. However, an order of paths may be established using a combination of the number of parties and an evaluation value.

A computer program for performing the above functions of the call control apparatus 10 is stored in a storage medium such as a semiconductor memory, a magnetic storage medium, or the like.

A modification according to the present invention will be described below. With the modification, establishment request messages are transmitted successively to output paths having progressively smaller delay times for establishing a call.

Figure 14:
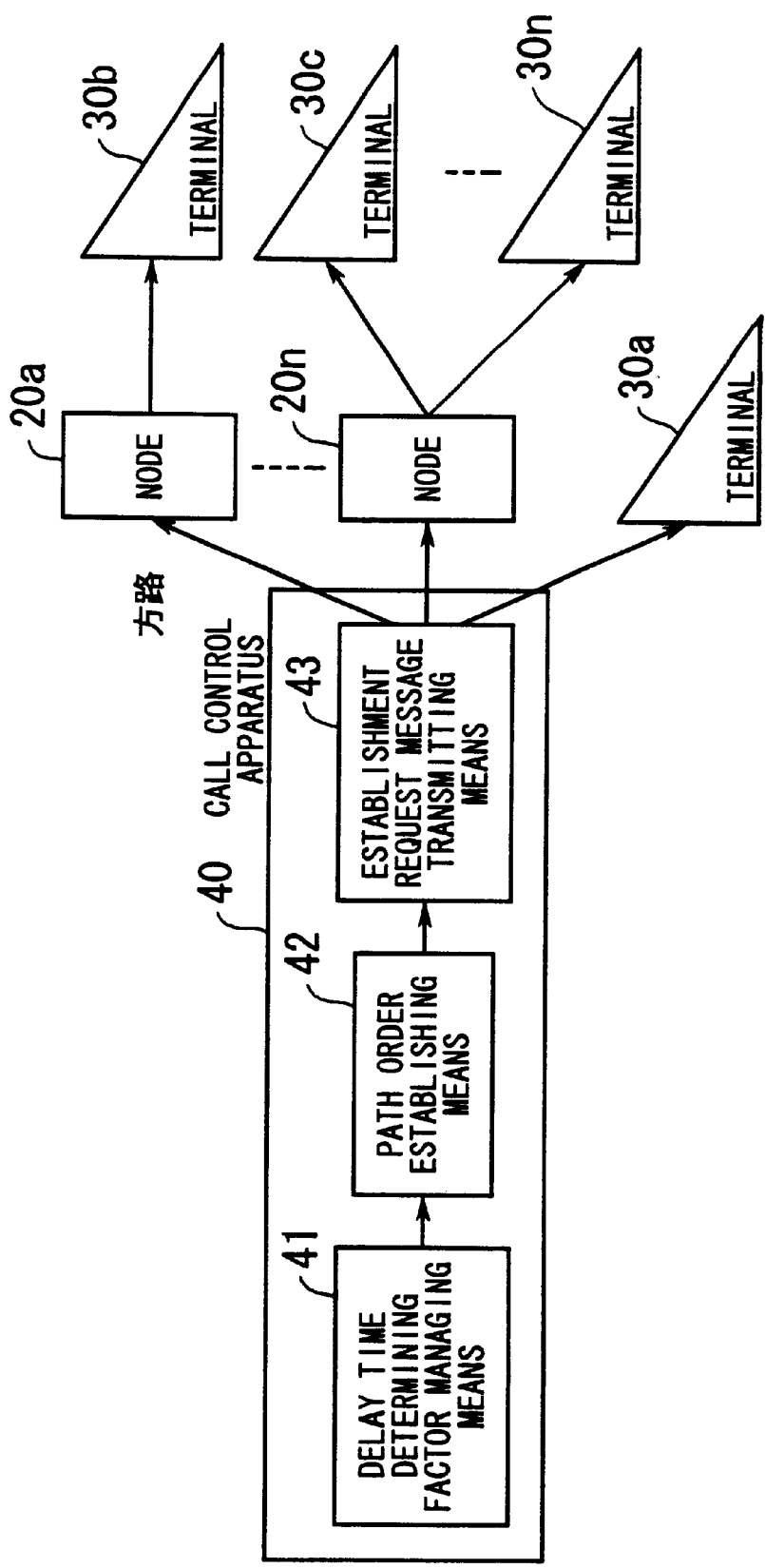
FIG. 14 is a block diagram illustrating the principles of a modified call control apparatus according to the present invention.

FIG. 14 shows a modified call control apparatus 40 according to the present invention. The call control apparatus 40 effects an establishing process of establishing a call to terminals 30a–30n that belong to the same call.

The call control apparatus 40 has a delay time determining factor managing means 41 for managing a delay time determining factor which determines a delay time of the establishing process for each path. The call control apparatus 40 also has a path order establishing means 42 for establishing an order of paths having successively smaller delay times based on the delay time determining factor and an establishment request message transmitting means 43 for transmitting establishment request messages to establish calls to nodes 20a–20n and a terminal 30a according to the established order of paths. Establishment request messages are transmitted through the nodes 20a–20n to terminals 30b–30n.

Figure 15:
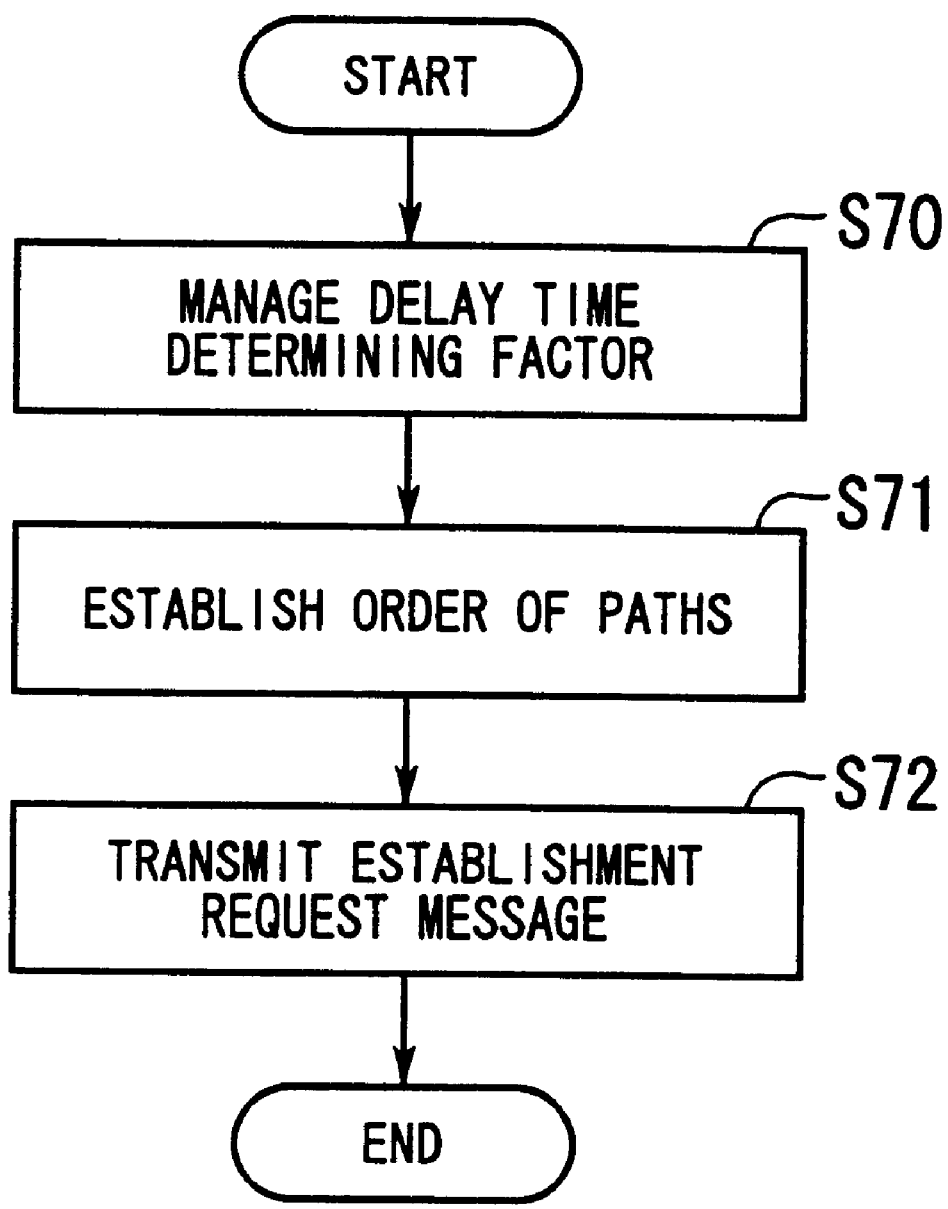
FIG. 15 is a flowchart of an operation sequence of the modified call control apparatus according to the present invention.

Operation of the call control apparatus 40 will be described below. FIG. 15 shows an operation sequence of the call control apparatus 40.

[S70] The delay time determining factor managing means 41 manages a delay time determining factor which determines a delay time of the establishing process for each path. The delay time determining factor is the number of terminals belonging to each path.

[S71] The path order establishing means 42 establishes an order of paths having successively smaller delay times based on the delay time determining factor.

[S72] The establishment request message transmitting means 43 transmits establishment request messages to establish calls to the nodes 20a–20n and the terminal 30a according to the established order of paths.

Figure 16:
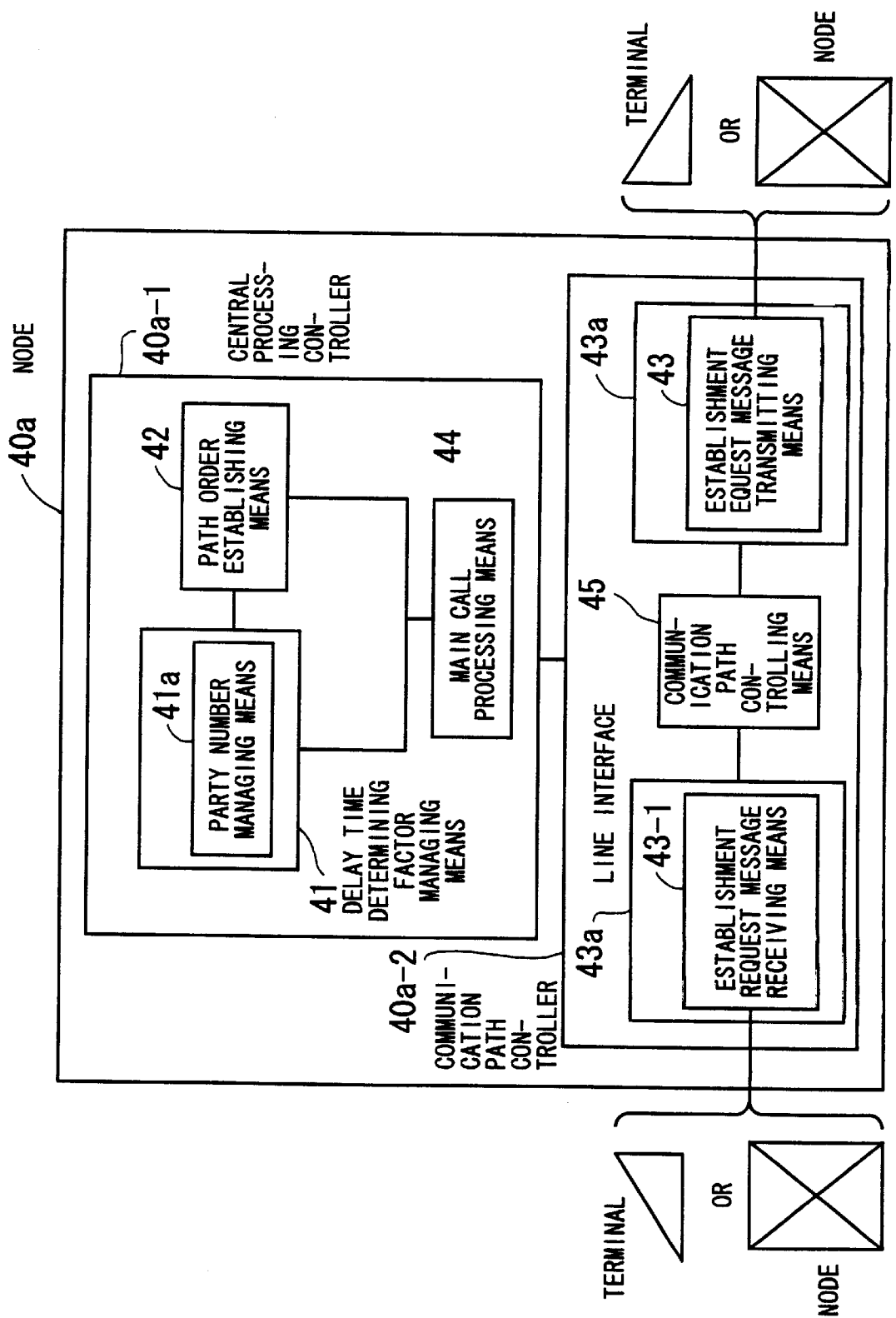
FIG. 16 is a detailed block diagram of a node which includes the modified call control apparatus.

Details of a node which incorporates the call control apparatus 40 will be described below. The call control apparatus 40 is accommodated in a node which corresponds to a switching exchange. FIG. 16 shows in detail a node 40a which incorporates the call control apparatus 40. Those parts shown in FIG. 16 which are identical to those shown in FIG. 14 are denoted by identical reference numerals and will not be described in detail below.

The node 40a comprises a central processing controller 40a-1 and a communication path controller 40a-2. The central processing controller 40a-1 has a basic processor for carrying logic operations inherent in the switching exchange, such as various operations, data transfer, data writing, and data reading. The delay time determining factor managing means 41 and the path order establishing means 42 are included in the central processing controller 40a-1.

The central processing controller 40a-1 has a main call processing means 44 connected to the delay time determining factor managing means 41 and the path order establishing means 42, for controlling overall call processing operation. The main call processing means 44 controls overall call processing operation by executing a control program stored in a ROM with a RAM used as a work area, and has a multiprocessor system architecture.

The delay time determining factor managing means 41 comprises a party number managing means 41a, and serves to manage a delay time determining factor which determines a delay time of the releasing process for each path.

The party number managing means 41a manages the number of parties, i.e., the number of terminals, belonging to each path as a delay time determining factor. Since the call control apparatus 40 transmits establishment request messages, it does not receive response signals from leaves or nodes, and hence cannot calculate the number of stages. Therefore, the call control apparatus 40 does not have the stage number managing means shown in FIG. 3.

The communication path controller 40a-2 serves to control a switch circuit network and line signals, and comprises a line interface 43a and a communication path controlling means 45.

The line interface 43a is connected to terminals and other nodes and monitors line states. The line interface 43a has an establishment request message transmitting means 43 and an establishment request message receiving means 43-1, and serve to transmit and receive control signals and various messages. The line interface 43a transmits and receives not only establishment request messages, but also other messages.

The communication path controlling means 45 has a function to control connection of the switch circuit network and establish paths, or a function to copy cells, and serves to control communication paths for multicasting the same information.

Figure 17:
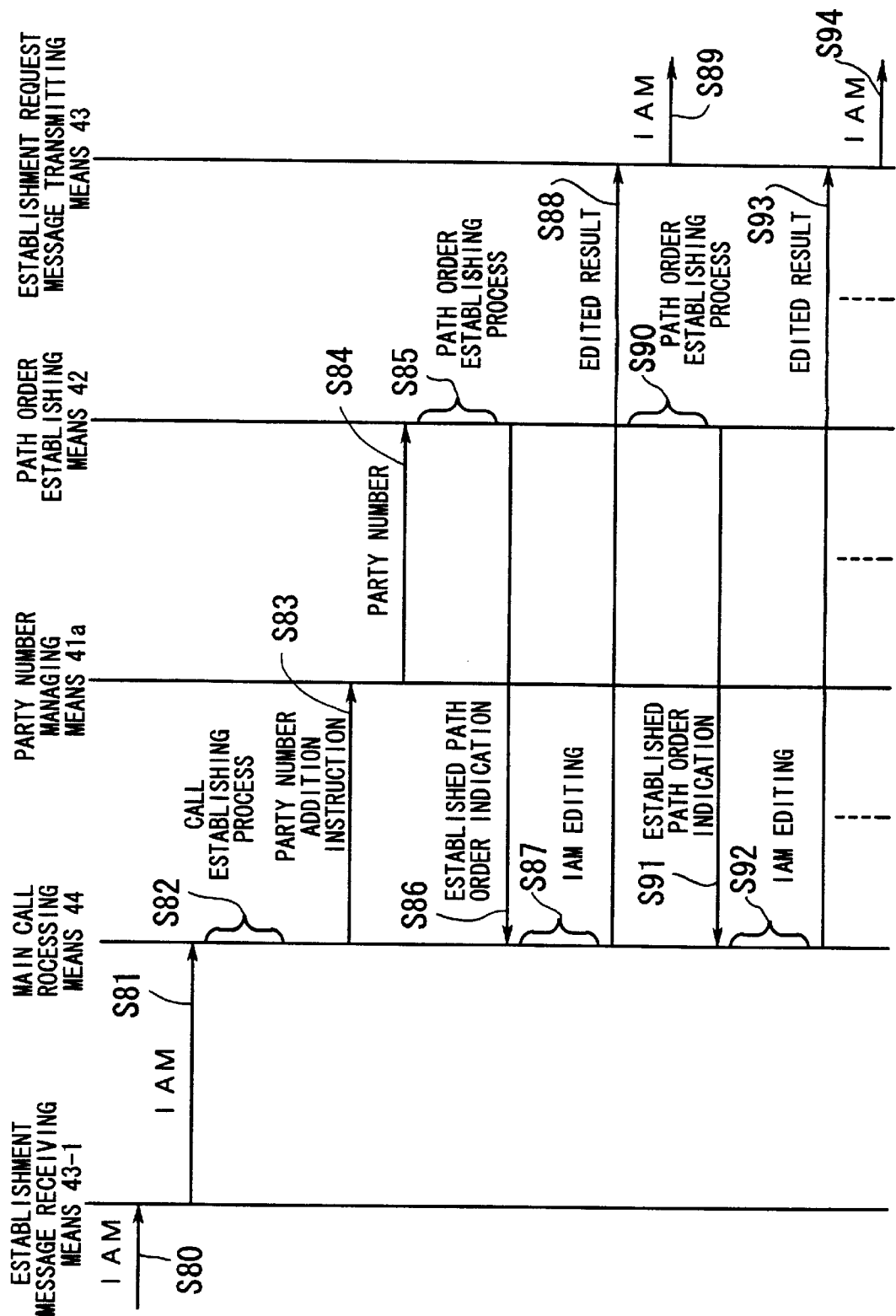
FIG. 17 is a sequence diagram showing a process of releasing a call with the modified call control apparatus based on the number of parties.

Operation of the call control apparatus 40 for establishing a call based on the number of parties will be described in detail below. FIG. 17 shows a process of establishing a call with the call control apparatus 40 based on the number of parties.

[S80] The establishment request message receiving means 43-1 receives an IAM signal, which is an establishment request message, from a preceding node. The IAM signal contains information representing an incoming call telephone number from a leaf.

[S81] The establishment request message receiving means 43-1 transmits the IAM signal to the main call processing means 44.

[S82] The main call processing means 44 effects a routing process, as a call establishing process, for establishing an output path for an incoming call based on the IAM signal.

[S83] The main call processing means 44 transmits a party number addition instruction signal for adding "1" to the number of parties with respect to the output path to the party number managing means 41a.

[S84] The party number managing means 41a adds "1" to the number of parties, and transmits the resultant number of parties to the path order establishing means 42.

The steps S83, S84 are carried out as many times as the number of telephone numbers.

[S85] The path order establishing means 42 selects an output path with the greatest number of parties in a path order establishing process.

[S86] The path order establishing means 42 indicates the output path with the greatest number of parties to the main call processing means 44 in an established path informing process.

[S87] The main call processing means 44 edits information of the IAM signal corresponding to the output path.

[S88] The main call processing means 44 transmits an edited result to the establishment request message transmitting means 43.

[S89] The establishment request message transmitting means 43 transmits an IAM signal to the output path with the greatest number of parties.

[S90] The path order establishing means 42 selects an output path with the second greatest number of parties in the path order establishing process.

[S91] The path order establishing means 42 indicates the output path with the second greatest number of parties to the main call processing means 44 in the established path informing process.

[S92] The main call processing means 44 edits information of the IAM signal corresponding to the output path.

[S93] The main call processing means 44 transmits an edited result to the establishment request message transmitting means 43.

[S94] The establishment request message transmitting means 43 transmits an IAM signal to the output path with the second greatest number of parties.

As described above, the call control apparatus 40 establishes an order of paths having successively smaller delay times consumed in establishing processes, and transmits establishment request messages according to the established order of paths. In this manner, the call control apparatus 40 shortens delay times consumed in establishing a call for thereby carrying out the overall establishing process efficiently.

A computer program for performing the above functions of the call control apparatus 40 is stored in a storage medium such as a semiconductor memory, a magnetic storage medium, or the like.

Figure 18:
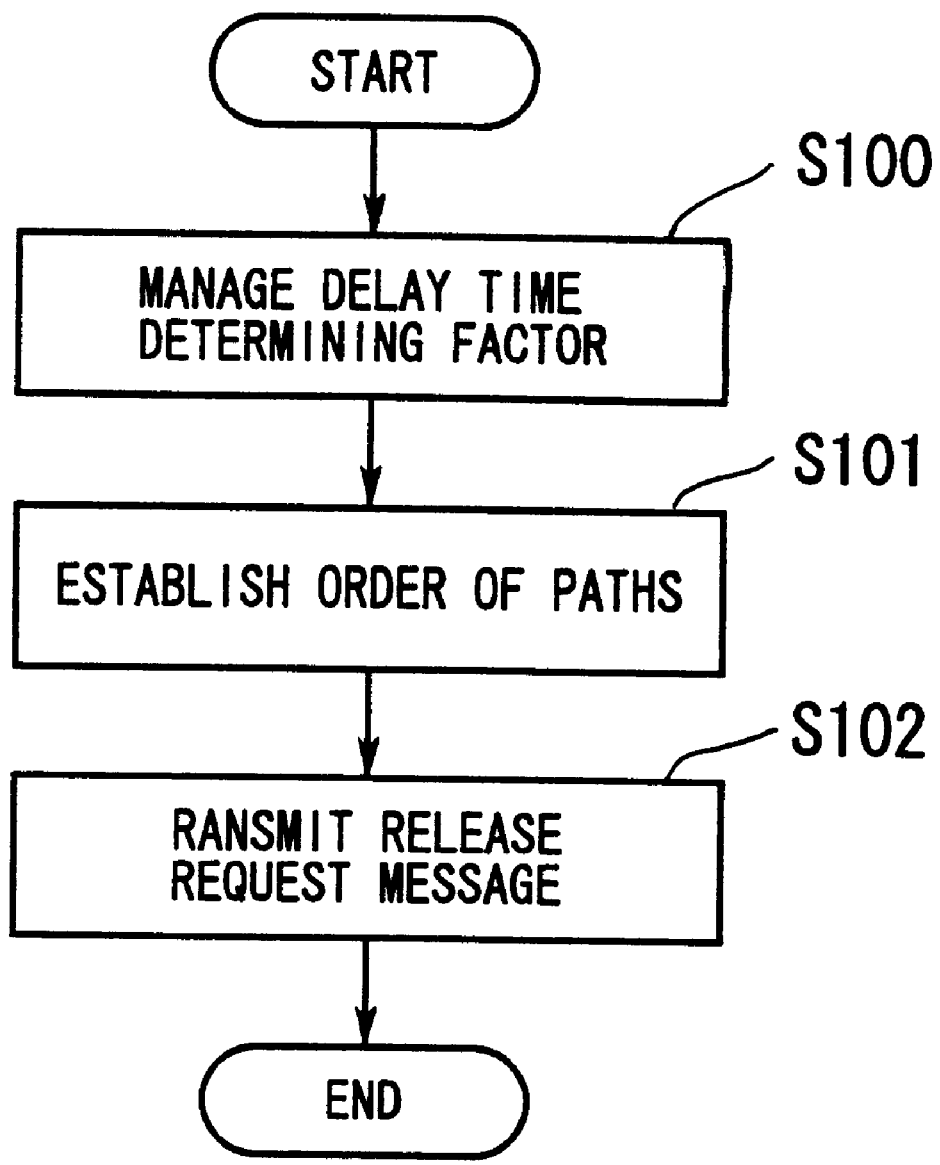
FIG. 18 is a flowchart of an operation sequence of a call control method according to the present invention.

A call control method of releasing a call according to the present invention will be described below. FIG. 18 shows an operation sequence of such a call control method according to the present invention.

[S100] A delay time determining factor which determines a delay time of the releasing process for each path is managed. The delay time determining factor is at least one of the number of terminals belonging to each path land the number of node stages belonging to each path.

[S101] An order of paths having successively smaller delay times is established on the basis of the delay time determining factor.

[S102] Release request messages to release calls are transmitted to nodes and terminals according to the established order of paths.

As described above, the call control method of releasing a call establishes an order of paths having successively smaller delay times consumed in releasing processes, and transmits release request messages according to the established order of paths. In this manner, delay times consumed in releasing a call are shortened for thereby carrying out the overall releasing process efficiently.

Figure 19:
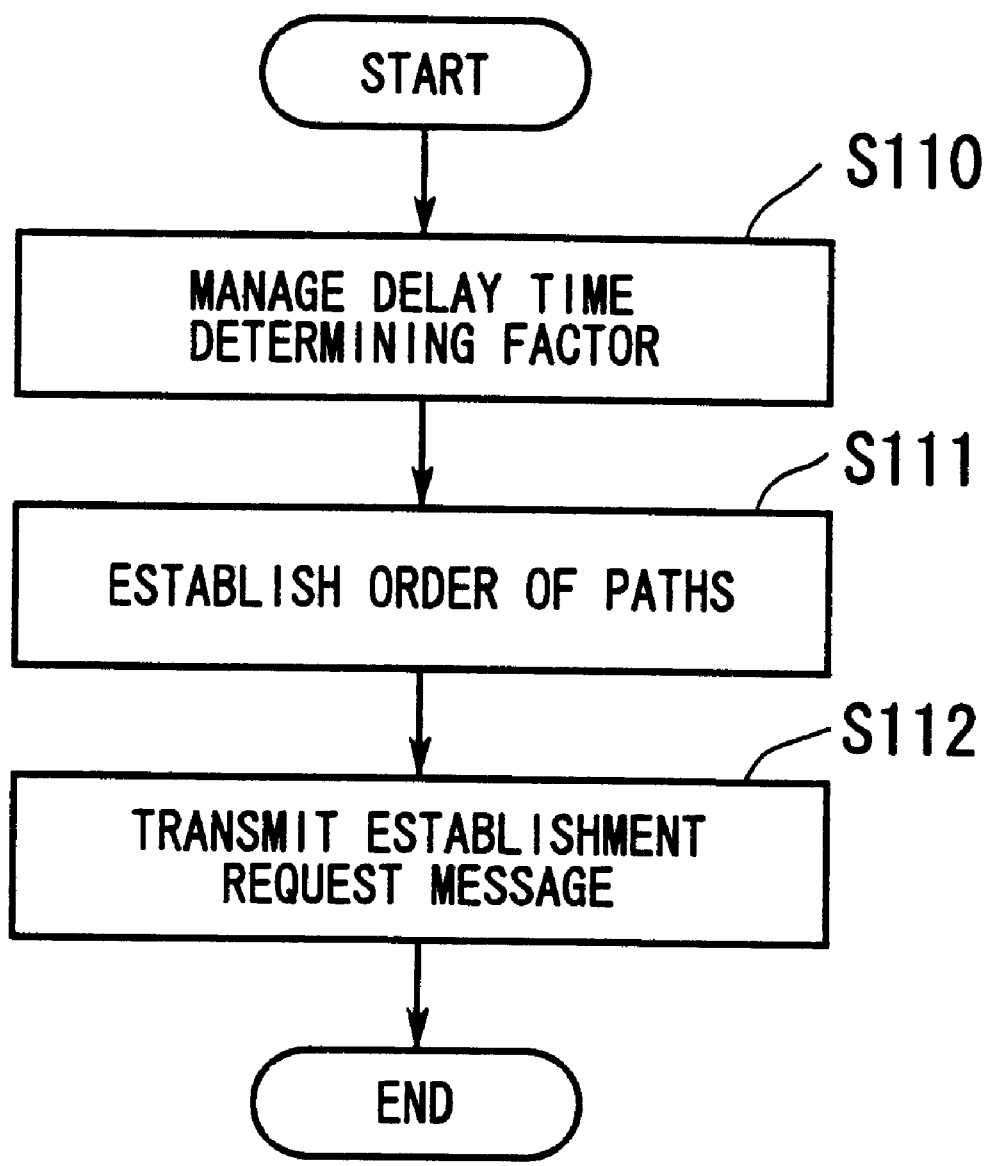
FIG. 19 is a flowchart of an operation sequence of another call control method according to the present invention.
Figure 20:
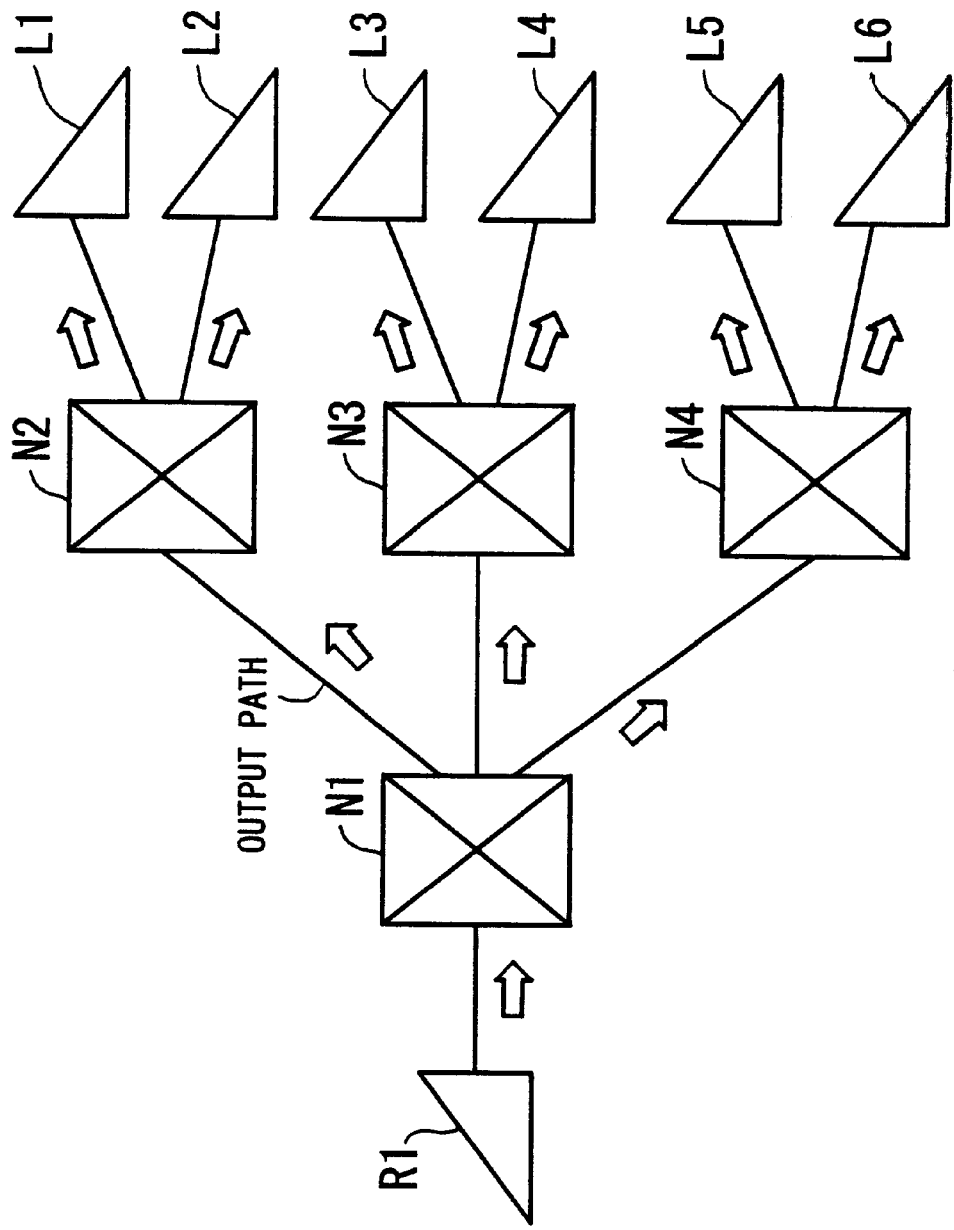
FIG. 20 is a block diagram of a connected configuration of a multicast call control system.
Figure 21:
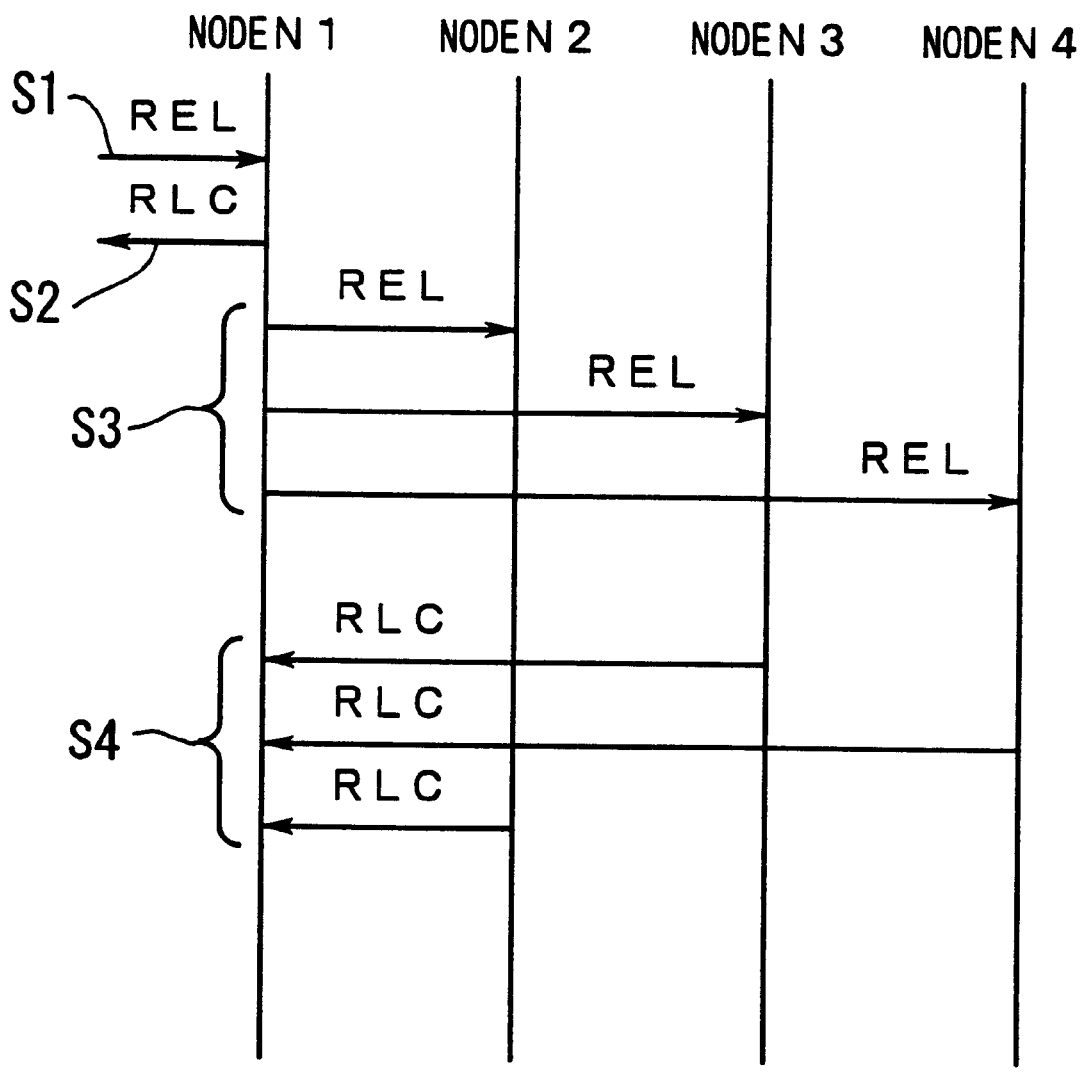
FIG. 21 is a sequence diagram of a releasing process.

A call control method of establishing a call according to the present invention will be described below. FIG. 19 shows an operation sequence of such a call control method according to the present invention.

[S110] A delay time determining factor which determines a delay time of the establishing process for each path is managed. The delay time determining factor is the number of terminals belonging to each path.

[S111] An order of paths having successively smaller delay times is established on the basis of the delay time determining factor.

[S112] Establishment request messages to establish calls are transmitted to nodes and terminals according to the established order of paths.

As described above, the call control method of establishing a call establishes an order of paths having successively smaller delay times consumed in establishing processes, and transmits establishment request messages according to the established order of paths. In this manner, delay times consumed in establishing a call are shortened for thereby carrying out the overall establishing process efficiently.

As described above, the call control apparatus according to the present invention establishes an order of paths having successively smaller delay times consumed in releasing processes, and transmits release request messages according to the established order of paths. In this manner, the call control apparatus can shorten the overall releasing process to effect the releasing process efficiently.

Furthermore, the call control apparatus according to the present invention establishes an order of paths having successively smaller delay times consumed in establishing processes, and transmits establishment request messages according to the established order of paths. In this manner, the call control apparatus can shorten the overall establishing process to effect the establishing process efficiently.

Additionally, the call control method of releasing a call establishes an order of paths having successively smaller delay times consumed in releasing processes, and transmits release request messages according to the established order of paths. In this manner, the call control method can shorten the overall releasing process to effect the releasing process efficiently.

Moreover, the call control method of establishing a call establishes an order of paths having successively smaller delay times consumed in establishing processes, and transmits establishment request messages according to the established order of paths. In this manner, the call control method can shorten the overall establishing process to effect the establishing process efficiently.

The storage medium which stores a call control program establishes an order of paths having successively smaller delay times consumed in releasing processes, and transmits release request messages according to the established order of paths. In this manner, the storage medium makes it possible to construct a computer which can shorten the overall releasing process to effect the releasing process efficiently.

The storage medium which stores a call control program establishes an order of paths having successively smaller delay times consumed in establishing processes, and transmits establishment request messages according to the established order of paths. In this manner, the storage medium makes it possible to construct a computer which can shorten the overall establishing process to effect the establishing process efficiently.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A call control apparatus for effecting a call releasing process, comprising:

delay time determining factor managing means for managing a delay time determining factor which determines a delay time of the call releasing process for each path;

path order establishing means for establishing an order of paths having successively smaller delay times based on said delay time determining factor; and release request message transmitting means for transmitting release request messages to effect the call releasing process to nodes or terminals according to said order of paths.

2. A call control apparatus according to claim 1, wherein said delay time determining factor managing means comprises means for managing the number of said terminals belonging to each path as said delay time determining factor.

3. A call control apparatus according to claim 1, wherein said delay time determining factor managing means comprises means for managing the number of said nodes belonging to each path as said delay time determining factor.

4. A call control apparatus according to claim 3, wherein said delay time determining factor managing means comprises means for managing the value of a function having said number of the nodes as a variable, as said delay time determining factor.

5. A call control apparatus for effecting a call establishing process, comprising:

delay time determining factor managing means for managing a delay time determining factor which determines a delay time of the call establishing process for each path;

path order establishing means for establishing an order of paths having successively smaller delay times based on said delay time determining factor; and establishment request message transmitting means for transmitting establishment request messages to effect the call establishing process to nodes or terminals according to said order of paths.

6. A call control apparatus according to claim 5, wherein said delay time determining factor managing means comprises means for managing the number of said terminals belonging to each path as said delay time determining factor.

7. A call control method of effecting a call releasing process, comprising the steps of:

managing a delay time determining factor which determines a delay time of the call releasing process for each path;

establishing an order of paths having successively smaller delay times based on said delay time determining factor; and transmitting release request messages to effect the call releasing process to nodes or terminals according to said order of paths.

8. A call control method of effecting a call establishing process, comprising the steps of:

managing a delay time determining factor which determines a delay time of the call establishing process for each path;

establishing an order of paths having successively smaller delay times based on said delay time determining factor; and transmitting establishment request messages to effect the call establishing process to nodes or terminals according to said order of paths.

9. A storage medium which stores a call control program for effecting a call releasing process by controlling a computer to function as:

delay time determining factor managing means for managing a delay time determining factor which determines a delay time of the call releasing process for each path;

path order establishing means for establishing an order of paths having successively smaller delay times based on said delay time determining factor; and release request message transmitting means for transmitting release request messages to effect the call releasing process to nodes or terminals according to said order of paths.

10. A storage medium which stores a call control program for effecting a call establishing process by controlling a computer to function as:

delay time determining factor managing means for managing a delay time determining factor which determines a delay time of the call establishing process for each path;

path order establishing means for establishing an order of paths having successively smaller delay times based on said delay time determining factor; and establishment request message transmitting means for transmitting establishment request messages to effect the call establishing process to nodes or terminals according to said order of paths.

* * * * *